May 9, 1950 J. W. BYRD 2,506,699
TRAILER
Filed Nov. 8, 1946 2 Sheets-Sheet 1
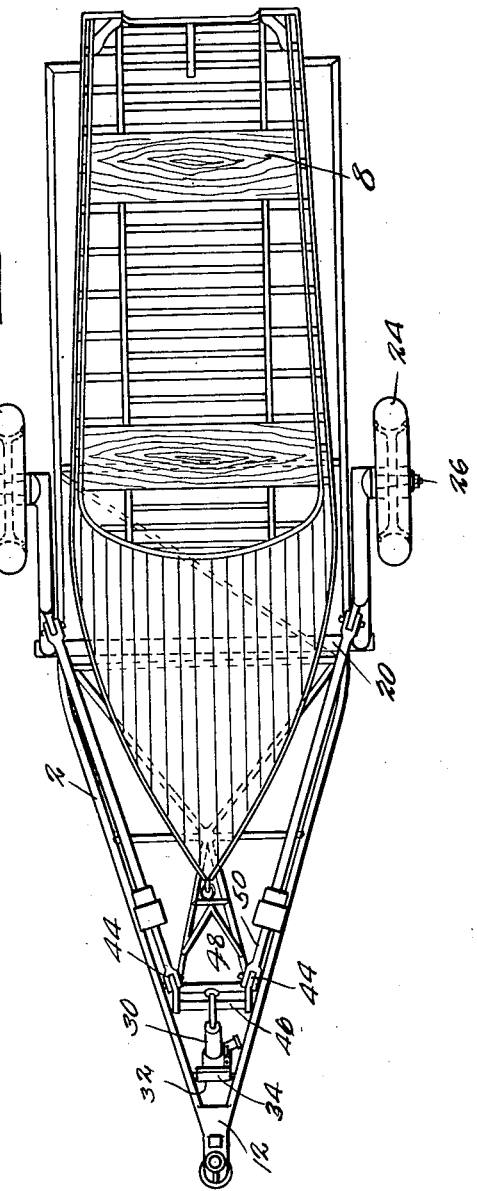
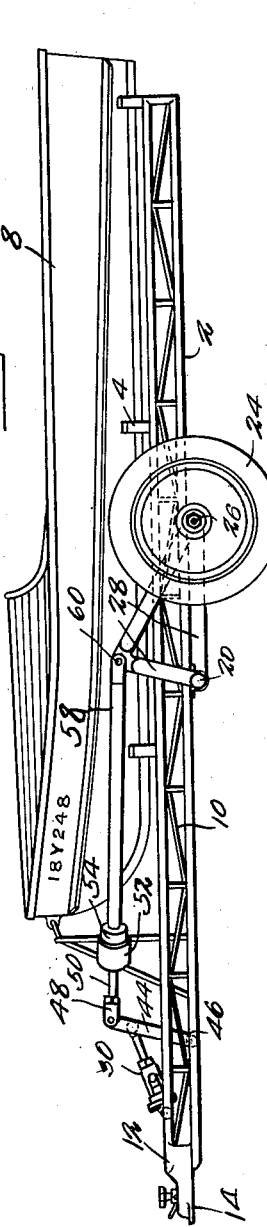
J. W. Byrd
INVENTOR May 9, 1950 J. W. BYRD 2,506,699
TRAILER
Filed Nov. 8, 1946 2 Sheets-Sheet 2
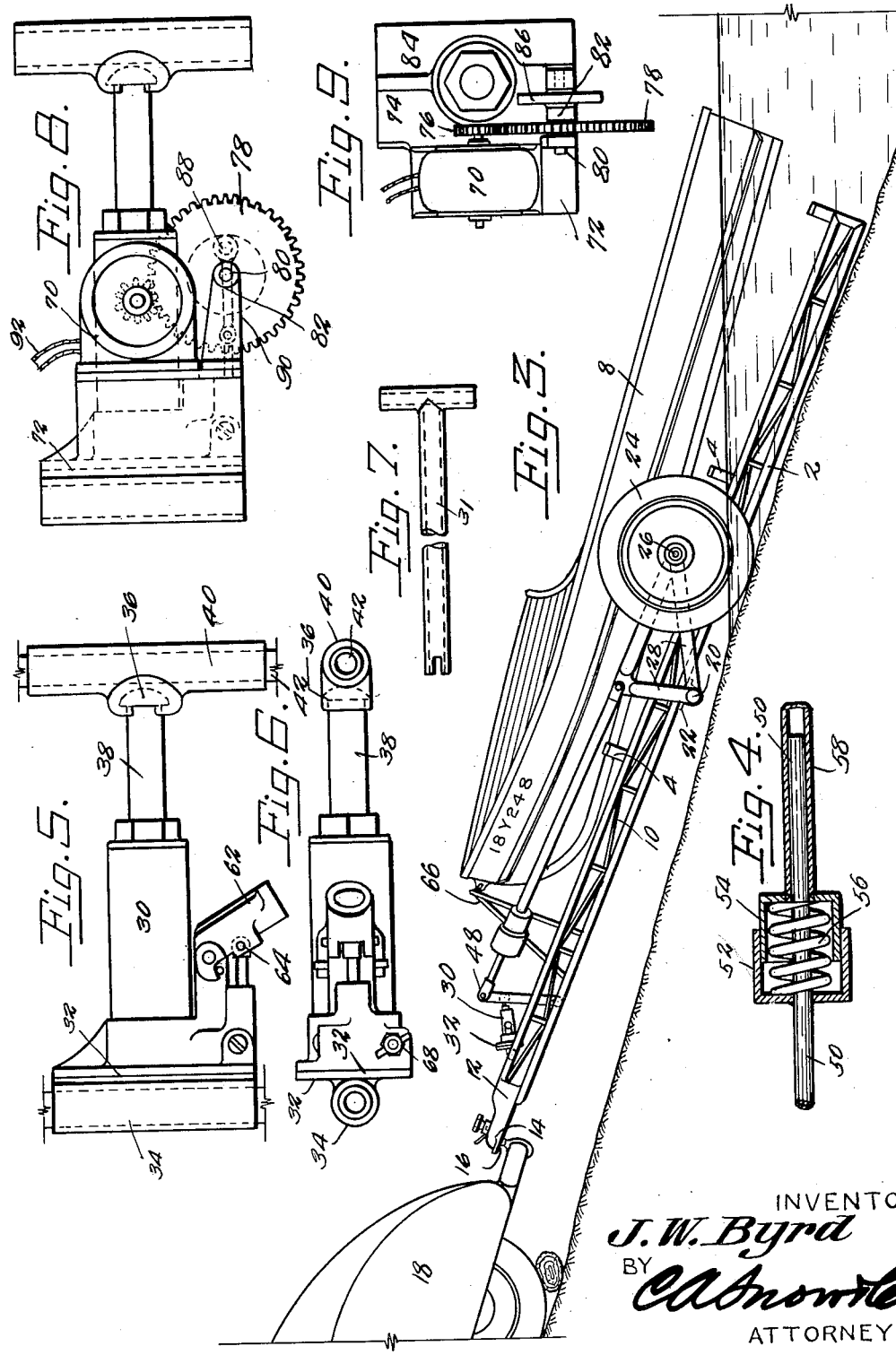
INVENTOR
J. W. Byrd
BY
ATTORNEYS Patented May 9, 1950

2,506,699

UNITED STATES PATENT OFFICE 2,506,699

TRAILER

James W. Byrd, Miami, Fla.

Application November 8, 1946, Serial No. 708,741

1 Claim. (Cl. 280—33.4)

My present invention relates to an improved trailer of the type especially designed for use in transporting boats and of such construction that the trailer may be driven into the water, the boat mounted, and the trailer pulled out with the boat for removal as desired.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is an elevational view of the trailer with boat in position ready to travel on a road.

Fig. 2 is a plan view of the trailer with boat in carrying position.

Fig. 3 is an elevational view of the trailer attached to motor car standing on the bank of a body of water with the boat in process of being launched or taken out of the water.

Fig. 4 is a longitudinal section through one of the shock absorbers.

Fig. 5 is a plan of the hydraulic jack with attachments for mounting in frame of trailer.

Fig. 6 is a side view of the hydraulic jack.

Fig. 7 is a detailed view of the handle for operating hydraulic jack.

Fig. 8 is a plan view of hydraulic jack with motor and drive to operate jack in lieu of hand operation.

Fig. 9 is a top view of hydraulic jack with motor and drive attached.

Referring now to drawings, I employ a frame 2 having cradles 4 with padding for the protection of boat 8. The frame 2 is preferably constructed of tubing with truss bracing 10 to effect rigidity but may be constructed of other suitable material. The frame 2 tapers and forms a single member 12 at the front end, thus roughly conforming to the shape of the boat 8, and forming a surface for the socket 14 for use with a ball joint 16 of the automobile 18.

A shaft 20 extended transversely below the frame is attached by straps 22 and the ends of the shaft project beyond the frame forming bearings.

Pneumatically tired wheels 24 are carried in stub shafts 26 which are rigidly secured to the braces 28 by welding or other suitable means to form a solid triangular unit.

A hydraulic jack 30 mounted on plate 32 is welded to a sleeve 34 on a cross member of the frame 2 being free to move as the jack is operated. A ball joint 36 is secured to the outer end of the jack ram 38 and is welded to a sleeve 40 on the cross bar 42 which joins levers 44. The lower ends of levers 44 are welded to a sleeve 46 which rides a cross member of the frame 2 and the upper ends of levers 44 are arranged to receive the forked ends 48 of short rods 50.

On these rods I provide a cylinder 52 securing the telescoping cylinder 54 and coil spring 56 is confined therein. Long tubular sleeves 58 are secured to the cylinder 54 and receive the extension ends of rod 50 to strengthen the tube connection and sleeves 58 are connected with the triangular frame 28 at 60. Thus movement of the actuating lever 62 pivotally mounted at 64 on the jack will extrude or retract the ram and through the above described linkage will pivot the frame 28 to elevate or lower the frame 2 with relation to the stub axles 26.

The shock absorber will cushion the strain of such movement and will also cushion the riding of the boat on the frame when the trailer is pulled over a road.

A stanchion 66 is provided near the bow of the boat to which the boat is secured by a rope or other means of fastening while en route, and which fastening is released when the boat is to be launched. To launch the boat the trailer carrying the same is backed into the water and by-pass valve 68 is released allowing the frame 28 to pivot and thus lower the frame 2 while the boat floats. The trailer is then pulled ashore. To remove the boat the reverse is followed and with the trailer positioned under the boat and the boat secured to the stanchion the jack is pumped by handle 31 to raise the frame 2 and the boat.

In lieu of the manual jack 30, a motor 70 may be mounted on plate 72 and by means of pinion 74 on shaft 76 and meshing with gear 78 which in turn is keyed to counter-shaft 80. Counter-shaft 80 is carried in bearings 82 mounted on plate 84 and has a crank disk 86 keyed to it. Crank disk 86 has a crank pin 88 which has a connecting rod 90 attached to pump plunger on the jack 30. Wires 92 may provide current from the automobile battery or a separate battery, as desired.

Having thus fully described by invention, what I claim as new and desire to secure by Letters Patent is:

A boat trailer comprising a main frame, means at the front end thereof for pivotally connecting the main frame to a fixed support, rigid triangular wheel frames pivoted to opposite sides of the middle portion of the main frame, wheels carried by the wheel frames, a jack mounted upon the front end of the main frame and between the sides thereof, an elongated telescoping rod connection extending between the jack and each wheel frame, shock-absorbing means mounted in the telescoping portions of each of the rod connections, and a support rigid with and upstanding from the front end of the main frame and adapted for pivotal connection to one end of a boat, the pivotal connection to the main frame, wheel connection, and rod connection of each wheel frame being disposed at the respective corner portions of said wheel frame.

JAMES W. BYRD.

REFERENCES CITED

The following references are of record in the file of this patent:

UNITED STATES PATENTS

| Number | Name | Date |
| --- | --- | --- |
| 2,141,781 | Allen | Dec. 27, 1938 |
| 2,227,762 | Ronning | Jan. 7, 1941 |
| 2,297,992 | Swim | Oct. 6, 1942 |

FOREIGN PATENTS

| Number | Country | Date |
| --- | --- | --- |
| 252,661 | Italy | Apr. 1, 1927 |